United States Patent
Sotani et al.

(10) Patent No.: US 10,612,449 B2
(45) Date of Patent: Apr. 7, 2020

(54) PISTON COOLING DEVICE (71) Applicant: HONDA MOTOR CO., LTD., Tokyo (JP)

(72) Inventors: Hiroshi Sotani, Saitama (JP); Shinsuke Kawakubo, Saitama (JP); Kazuya Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/938,103

(22) Filed: Mar. 28, 2018

(65) Prior Publication Data
US 2018/0283257 A1    Oct. 4, 2018

(30) Foreign Application Priority Data

Mar. 29, 2017   (JP) .................................. 2017-066331

(51) Int. Cl.
*F01P 3/08*   (2006.01)
*F01P 11/06*   (2006.01)
(Continued)

(52) U.S. Cl.
CPC ................. *F01P 3/08* (2013.01); *F01M 1/08* (2013.01); *F01M 1/10* (2013.01); *F01P 11/06* (2013.01);
(Continued)

(58) Field of Classification Search
CPC ...... F01M 1/08; F01M 1/10; F01M 2005/004; F01M 5/002; F01P 3/08
See application file for complete search history.

(56) References Cited

U.S. PATENT DOCUMENTS 4,206,726 A * 6/1980 Johnson, Jr. .............. F01P 3/08
                                                      123/41.35
4,901,679 A * 2/1990 Hodgkins ................. F01P 3/08
                                                      123/41.35
(Continued)

FOREIGN PATENT DOCUMENTS

JP    H04-059309 U    5/1992
JP    2009-228580 A   10/2009
(Continued)

OTHER PUBLICATIONS

Aug. 7, 2018, Japanese Office Action issued for related JP application No. 2017-066331.

*Primary Examiner* — Long T Tran
(74) *Attorney, Agent, or Firm* — Paratus Law Group, PLLC (57) ABSTRACT

A piston cooling device includes a main body which includes a communication path communicating with an oil passage provided in the internal combustion engine, a nozzle pipe portion which includes an oil injection port for injecting an oil passing through the communication path, toward the piston, and a filter which is provided at an upstream side of the nozzle pipe portion in an oil flow path to filter the oil. The main body includes a cylindrical portion inserted into the oil passage. The filter has a bottomed cylindrical shape in which a filter side surface stands from a filter bottom surface, and is held inside the cylindrical portion. Filter holes are formed in the filter bottom surface and the filter side surface. The filter is disposed such that the filter bottom surface protrudes further upstream side in the oil flow path than a tip end of the cylindrical portion.

6 Claims, 5 Drawing Sheets

(51) Int. Cl.
*F01M 1/10* (2006.01)
*F01M 1/08* (2006.01)
*F16N 39/06* (2006.01)
*F01P 3/00* (2006.01)

(52) U.S. Cl.
CPC ....... *F16N 39/06* (2013.01); *F01M 2001/083* (2013.01); *F01P 2003/006* (2013.01); *F01P 2011/061* (2013.01)

(56) References Cited

U.S. PATENT DOCUMENTS

| | | | |
|---|---|---|---|
| 2004/0031736 A1* | 2/2004 | Evans | B01D 29/216 210/167.02 |
| 2004/0031737 A1* | 2/2004 | Evans | B01D 29/33 210/167.02 |
| 2015/0040846 A1* | 2/2015 | Gokan | B01D 35/005 123/41.39 |
| 2015/0290188 A1* | 10/2015 | Brown | A61K 31/495 514/255.04 |
| 2016/0290188 A1 | 10/2016 | Gokan | |

FOREIGN PATENT DOCUMENTS

| | | |
|---|---|---|
| JP | 2015-031246 A | 2/2015 |
| JP | 2016-188623 A | 11/2016 |

* cited by examiner

PISTON COOLING DEVICE

CROSS-REFERENCE TO RELATED APPLICATIONS

The present application claims the benefit of priority of Japanese Patent Application No. 2017-066331, filed on Mar. 29, 2017, the content of which is incorporated herein by reference.

TECHNICAL FIELD

The present invention relates to a piston cooling device for an internal combustion engine, and more particularly, to a piston cooling device which cools a piston by oil injection from a back surface side of the piston.

BACKGROUND ART

A related-art piston cooling device in an internal combustion engine is configured such that a nozzle pipe communicating with an oil passage provided in the internal combustion engine is extended toward a back surface of a piston and oil is injected from the nozzle pipe.

For example, JP-A-2015-31246 discloses a cooling device which is detachably attached to an internal combustion engine. The cooling device includes a main body, a filter which is detachably provided at an upstream side of the main body in an oil flow path, and a nozzle pipe which is provided at a downstream side of the main body. The main body is attached to the internal combustion engine while the filter is mounted on the main body.

The piston cooling device disclosed in JP-A-2015-31246 has a structure in which the filter which is detachably provided at the upstream side of the main body in the oil flow path in a cap shape can prevent clogging of the nozzle pipe and trap foreign matters or foreign particles in the oil.

However, since the piston cooling device is provided in a crankcase of the internal combustion engine and its own size is small, it is difficult to increase a filter area and extending the life (maintenance cycle) of the filter.

SUMMARY

The present invention has been made in view of the above-described circumstances, and an aspect of the present invention provides a piston cooling device capable of extending a life of a filter.

Accordingly, an embodiment of the present invention provides (1) a piston cooling device includes:

a main body which is attached to an internal combustion engine and includes a communication path communicating with an oil passage provided in the internal combustion engine;

a nozzle pipe portion which includes an oil injection port for injecting an oil passing through the communication path, toward the piston; and a filter which is provided at an upstream side of the nozzle pipe portion in an oil flow path to filter foreign matters in the oil, wherein the main body includes a cylindrical portion inserted into the oil passage, wherein the filter has a bottomed cylindrical shape in which a filter side surface stands from a filter bottom surface, and is held inside the cylindrical portion, wherein filter holes are formed in the filter bottom surface and the filter side surface, and wherein the filter is disposed such that the filter bottom surface protrudes further upstream side in the oil flow path than a tip end of the cylindrical portion.

(2) In the piston cooling device of (1), the main body may include a large-diameter cylindrical portion which is positioned in contact with an inner wall surface of the oil passage, and a small-diameter cylindrical portion which has a smaller diameter than the large-diameter cylindrical portion and holds the filter.

(3) In the piston cooling device of (1) or (2), the filter may include a recess portion recessed toward a downstream side of the oil flow path at an approximate center of the filter bottom surface, and the filter holes are also formed in the recess portion.

(4) In the piston cooling device of (3), the oil passage may include an insertion hole into which the main body is inserted and an upstream hole which is connected to the insertion hole through a step portion and has a smaller diameter than the insertion hole, and the filter bottom surface of the filter may be disposed along the step portion.

(5) In the piston cooling device of any one of (1) to (4), the oil passage to which the main body is inserted may be a downward oil supply hole in a use state of the internal combustion engine.

(6) In the piston cooling device of any one of (1) to (5), the filter hole formed in the filter side surface of the filter may be disposed at further upstream side in the oil flow path than the tip end of the cylindrical portion.

Advantageous Effects

According to the configuration of (1), since the filter holes are provided at the filter bottom surface and the filter side surface of the bottomed cylindrical filter in which the filter side surface stands from the filter bottom surface, and the filter bottom surface is held inside the cylindrical portion so as to protrude further upstream side in the oil flow path than the tip end of the cylindrical portion, even when the foreign matters or foreign particles in the oil are trapped by the filter bottom surface, the oil passage is ensured by the filter holes in the filter side surface. Therefore, the filter function can be maintained over a long period of time, and the life of the filter can be extended.

According to the configuration of (2), since the main body includes the large-diameter cylindrical portion which is positioned in contact with the inner wall surface of the oil passage and the small-diameter cylindrical portion which has a smaller diameter than the large-diameter cylindrical portion and holds the filter, a space formed between the small-diameter cylindrical portion and the inner wall surface of the oil passage can function as a trap space for trapping foreign matters in the oil, and it is possible to further extend the life of the filter by keeping the foreign matters in the space.

According to the configuration of (3), since the filter includes the recess portion recessed toward the downstream side of the oil flow path at the approximate center of the filter bottom surface, and the filter holes are also formed in the recess portion, it is possible to increase the filter area of the filter and extend the life of the filter. In addition, in the configuration in which the recess portion is recessed toward the downstream side of the oil passage, the foreign matters can be trapped in the recess portion on the filter bottom surface, the foreign matters can be prevented from turning toward the filter side surface and the life of the filter can be further extended.

According to the configuration of (4), the oil passage includes the insertion hole into which the main body is inserted and an upstream hole which is connected to the insertion hole through a step portion and has a smaller diameter than the insertion hole, since the filter bottom surface of the filter is disposed along the step portion, the distance between the step portion and an outer peripheral edge of the filter bottom surface can be adjusted to prevent large foreign matters from entering the filter side surface through a gap between the filter bottom surface and the step portion, and the life of the filter can be further extended.

According to the configuration of (5), since the oil passage to which the main body is inserted is the downward oil supply hole in the use state of the internal combustion engine, it is possible to prevent the trapped foreign matters from returning into the oil flow path even in the operation stop state. In addition, foreign matters are easily removed at the time of maintenance.

According to the configuration of (6), since the filter hole provided in the filter side surface of the filter is disposed at further upstream side in the oil flow path than the tip end of the cylindrical portion, even when the foreign matters or foreign particles in the oil are trapped by the filter bottom surface, the oil passage is ensured by the filter hole on the filter side surface.

DESCRIPTION OF EMBODIMENTS

Hereinafter, an embodiment of a piston cooling device of an internal combustion engine according to an embodiment of the present invention will be described with reference to FIGS. 1 to 5. The piston cooling device of the internal combustion engine described below is not particularly limited, but is preferably used for a saddle-type vehicle such as a motorcycle. Incidentally, for the description of the directions such as upper, lower, left and right in the present specification, it is assumed that the accompanying drawings are viewed in a direction of reference numerals.

Figure 1:
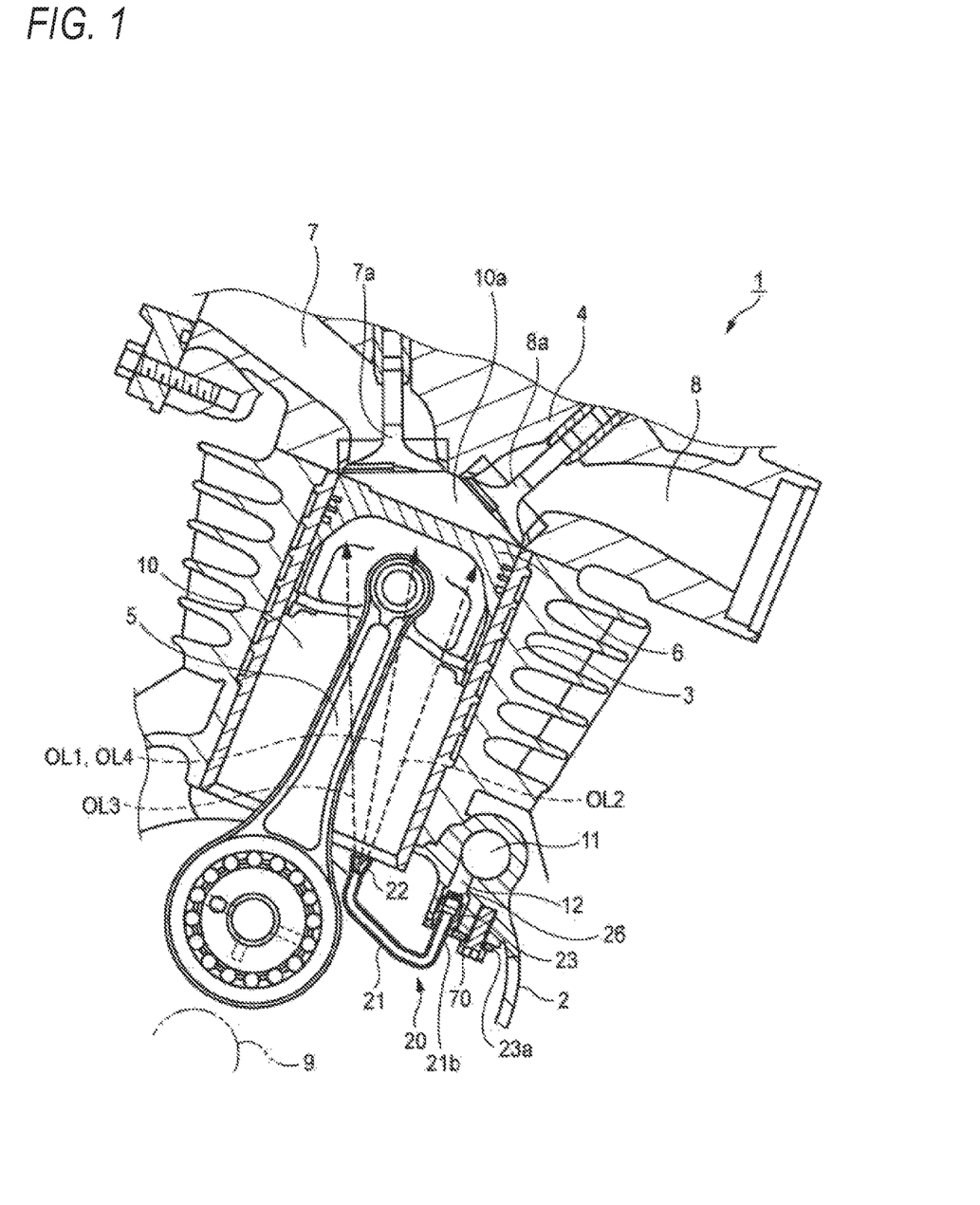
FIG. 1 is a partial cross-sectional view of an internal combustion engine including a piston cooling device according to an embodiment of the present invention as viewed from an axial direction of a crankshaft.

In an internal combustion engine 1 of the present embodiment, as shown in FIG. 1, a cylinder bore 10 is formed by a cylinder 3 provided upward from a crankcase 2 and a cylinder head 4. A connecting rod 5 connected to a crankshaft 9 is connected to a piston 6 which moves up and down in the cylinder bore 10, from a back side thereof. An intake port 7 and an exhaust port 8 are disposed in a combustion chamber 10a surrounded by an upper surface of the piston 6 and the cylinder bore 10, and intake and exhaust are appropriately performed by valves 7a, 8a at a timing corresponding to a combustion cycle.

The piston cooling device 20 is provided at a lower portion of the cylinder bore 10. The piston cooling device 20 communicates with an oil passage 12 connected to an oil gallery 11 provided in the internal combustion engine 1. That is, the piston cooling device 20 is connected to the oil passage 12 serving as a downward oil supply hole in the use state of the internal combustion engine 1 and is provided so as to inject oil toward a back surface side of the piston 6.

Figure 2:
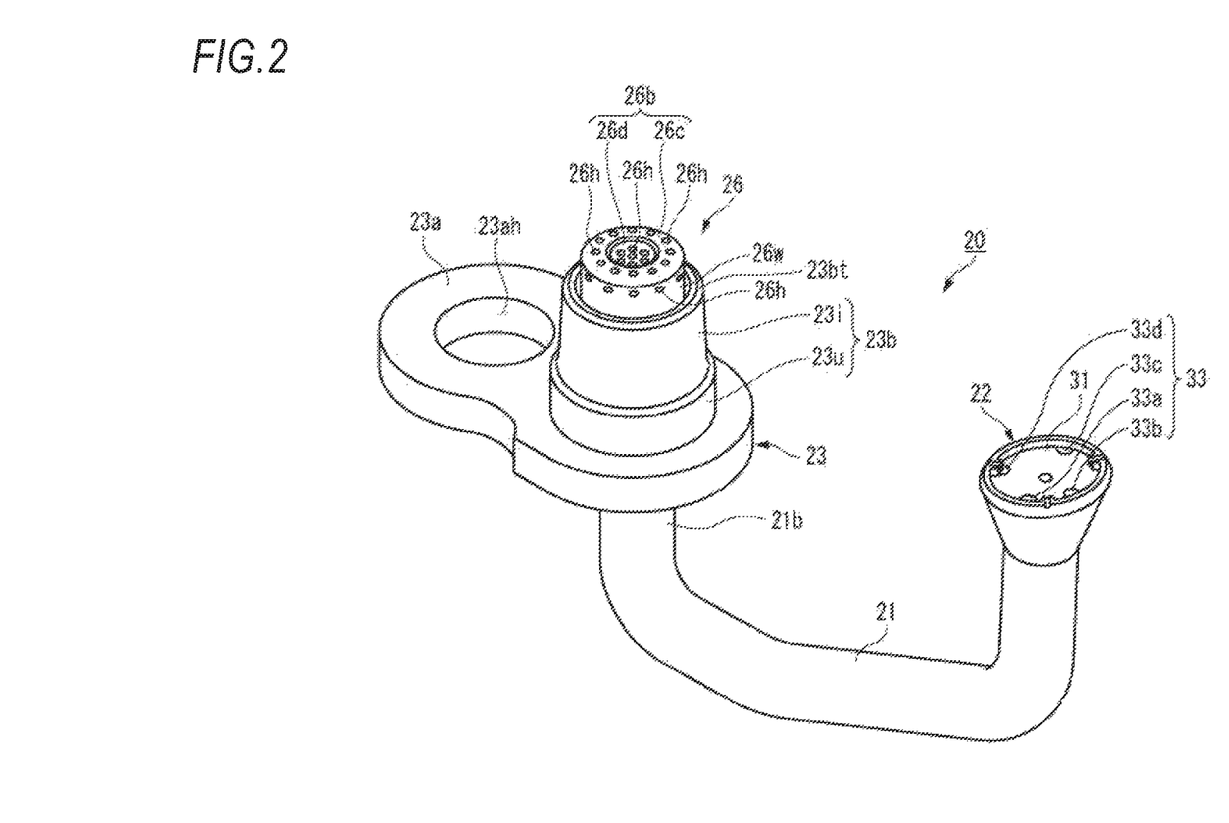
FIG. 2 is a perspective view of the piston cooling device.

As shown in FIG. 2, the piston cooling device 20 includes a substantially cylindrical main body 23, a body fixing portion 23a extending radially outward from an outer peripheral surface of the main body 23 so as to surround the outer peripheral surface of the main body 23, a nozzle pipe portion 21 inserted into a lower side of the main body 23, and a filter 26 mounted on an upper side of the main body 23.

Referring to FIG. 1, in the piston cooling device 20, the nozzle pipe portion 21 extending from a lower end side of the main body 23 toward an inside of the cylinder bore 10 in a substantially U shape. The nozzle pipe portion 21 is formed at a tip end thereof with a tip end portion 22 having a plurality of oil injection ports 33. On the other hand, a base end portion 21b of the nozzle pipe portion 21 is inserted and connected to the main body 23. The main body 23 is fixed by an attachment screw 70 penetrating an attachment hole 23ah of the body fixing part 23a in the crankcase 2.

Figure 3:
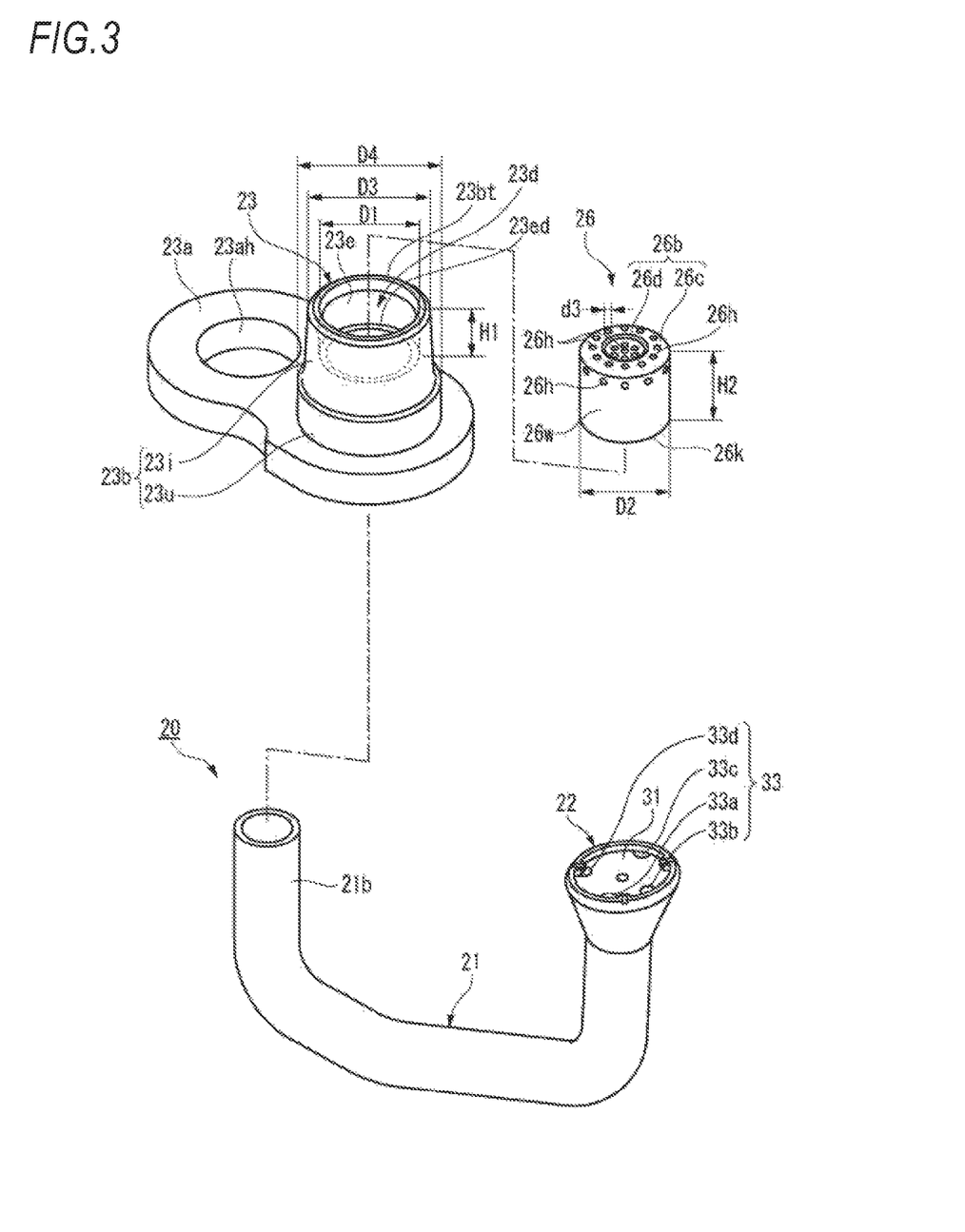
FIG. 3 is an exploded perspective view of the piston cooling device.

As shown in FIGS. 2 and 3, the tip end portion 22 has a shape of a substantially inverted circular truncated cone. A total of four oil injection ports 33, i.e. a first oil injection port 33a, a second oil injection port 33b, a third oil injection port 33c and a fourth oil injection port 33d formed at the tip end surface 31 of the tip end portion 22 along an outer peripheral edge thereof are opened toward the upper part of the cylinder bore 10. The oils OL1 to OL4 supplied from an oil pump (not shown) are injected from the first to the fourth oil injection ports 33a, 33b, 33c, 33d toward the back surface of the piston 6.

The main body 23 has a cylindrical portion 23b inserted into the oil passage 12. The cylindrical portion 23b has a large-diameter cylindrical portion 23u positioned in contact with an inner wall surface 12iw (see FIG. 4) of the oil passage 12 and a small-diameter cylindrical portion 23i with the outer diameter D3 smaller than the outer diameter D4 of the large-diameter cylindrical portion 23u and protruding further upstream side in an oil flow path than the large-diameter cylindrical portion 23u. The filter 26 is detachably provided inside the small-diameter cylindrical portion 23i of the cylindrical portion 23b.

Figure 4:
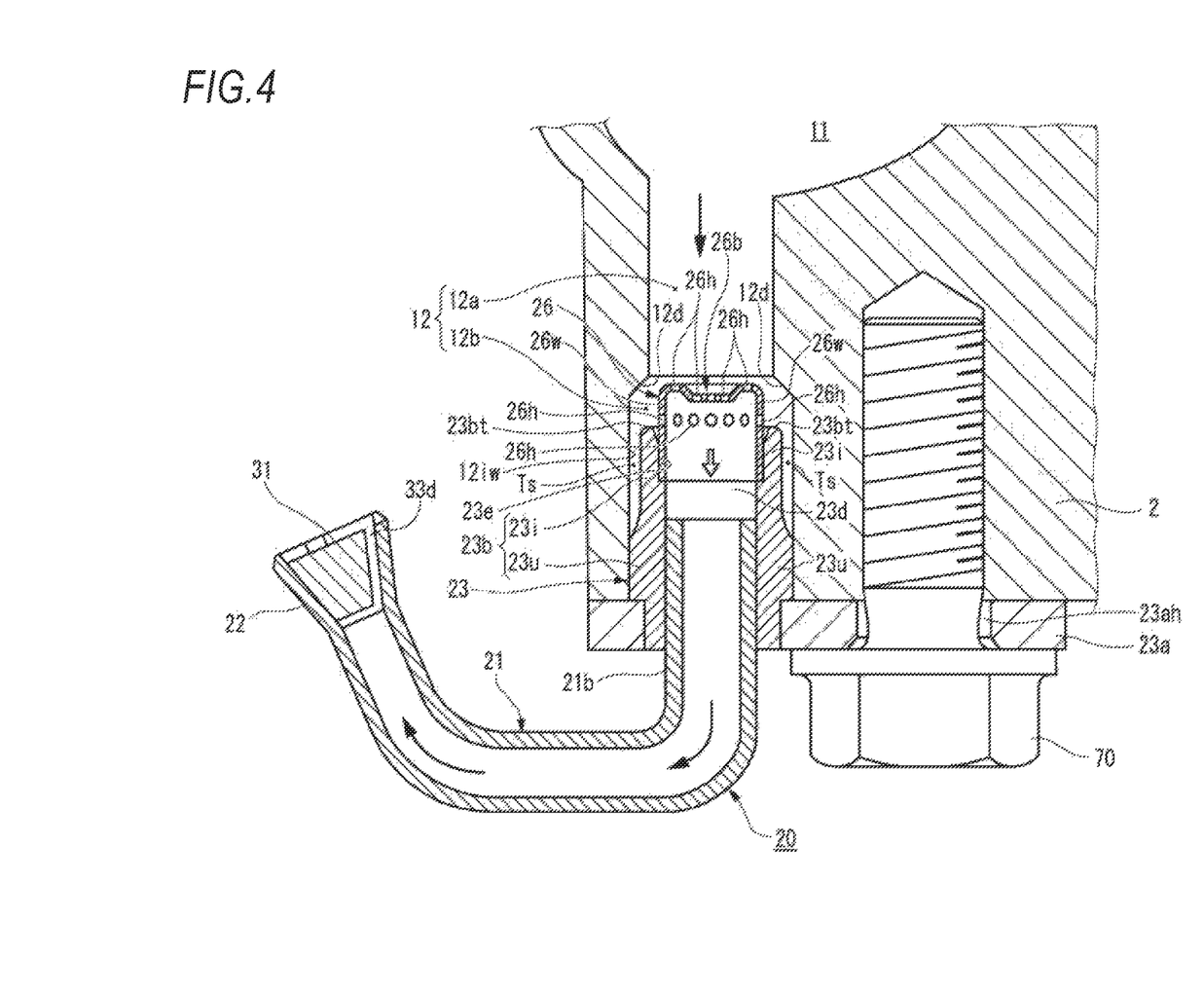
FIG. 4 is a partial cross-sectional view of the piston cooling device in a mounted state.
Figure 5:
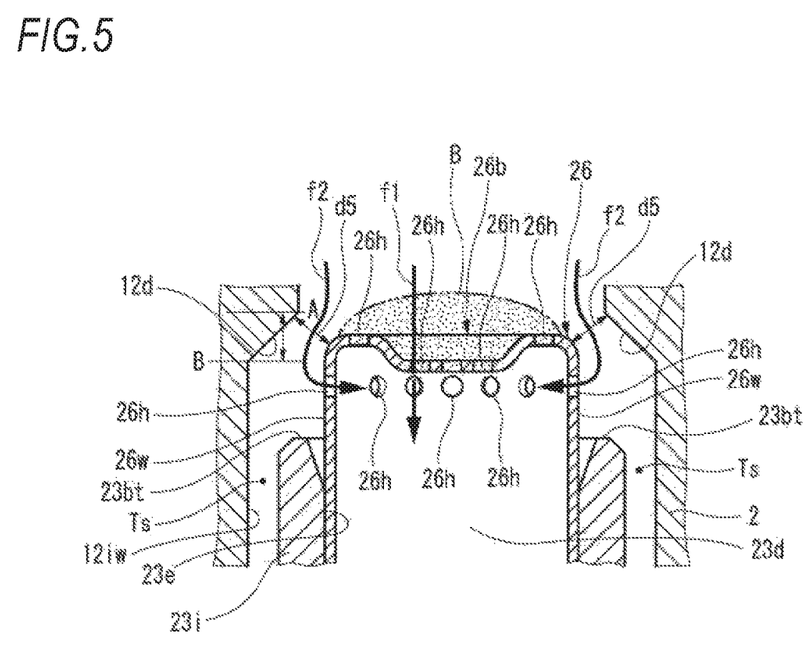
FIG. 5 is an enlarged view of FIG. 4.

The large-diameter cylindrical portion 23u is positioned in contact with the inner wall surface 12iw of the oil passage 12, so that a space Ts is formed between the small-diameter cylindrical portion 23i and the inner wall surface 12iw of the oil passage 12 (see FIGS. 4 to 5).

The filter 26 has a bottomed cylindrical shape in which a filter side surface 26w stands from a filter bottom surface 26b.

As also shown in FIG. 4, the filter 26 is fitted such that the filter side surface 26w of the filter 26 abuts an inner peripheral wall 23e of the small-diameter cylindrical portion 23i. That is, the outer diameter D2 of the filter 26 is set to be substantially the same size as the inner diameter D1 of the inner peripheral wall 23e, and the filter 26 is fitted into the inner peripheral wall 23e by light press fitting. Incidentally, in this specification, the term "light press fitting" refers to a press fitting in which detachment and attachment of the filter 26 with respect to the inner peripheral wall 23e of the small-diameter cylindrical portion 23i can be easily performed by a worker's manual work.

The height H2 of the filter 26 is formed larger than the depth H1 of an inner peripheral step portion 23ed of the inner peripheral wall 23e of the small-diameter cylindrical portion 23i, and the filter 26 is pushed and positioned until the lower end portion 26k comes into contact with the inner peripheral step portion 23ed. Accordingly, the filter 26 is disposed such that the filter bottom surface 26b protrudes further upstream side in the oil flow path than a tip end 23bt of the cylindrical portion 23b.

Here, filter holes 26h are formed at the filter bottom surface 26b and the filter side surface 26w of the filter 26. The filter bottom surface 26b has a stepped structure which has a recess portion 26d at the center of an upper surface portion 26c. That is, the filter bottom surface 26b has a stepped structure which has the upper surface portion 26c and the recess portion 26d recessed toward the lower side (the downstream side of the oil flow path in the attached state) with respect to the upper surface portion 26c. The plurality of filter holes 26h are formed in both the upper surface portion 26c and the recess portion 26d at equal intervals in the peripheral direction. In addition, the plurality of filter holes 26h are also formed in the filter side surface 26w at equal intervals in the peripheral direction.

The filter 26 is mounted such that the filter bottom surface 26b protrudes further upstream side in the oil flow path than the tip end 23bt of the cylindrical portion 23b, and the filter holes 26h formed in the filter side surface 26w are also located at further upstream side in the oil flow path than the tip end 23bt of the cylindrical portion 23b. Therefore, the filter holes 26h in the filter side surface 26w are also parts of the oil flow path.

As shown in FIGS. 4 and 5, the oil passage 12 in which the main body 23 is disposed has an insertion hole 12b into which the cylindrical portion 23b is inserted and an upstream hole 12a connected to the insertion hole 12b through a step portion 12d and having a smaller diameter than the insertion hole 12b. The filter bottom surface 26b of the filter 26 is disposed along the step portion 12d. That is, the filter bottom surface 26b of the filter 26 is located between the upstream side end portion A and the downstream side end portion B of the step portion 12d. Therefore, the distance d5 (see FIG. 5) between the filter bottom surface 26b and the step portion 12d can be appropriately set in consideration of the trap of foreign matters.

As shown in FIG. 4, the base end portion 21b of the nozzle pipe portion 21 is inserted into the lower side of the main body 23.

In the present embodiment, the diameter d3 of the filter hole 26h of the filter 26 is formed to be smaller than the minimum diameter of the oil injection port 33. Therefore, the oil injection port 33 is not blocked by minute foreign matters passed through the filter holes 26h.

Hereinafter, the operation when the foreign matters in the oil are trapped in the filter 26 will be described with reference to FIG. 5.

In FIG. 5, when the foreign matter B accumulates on the upper surface of the filter 26, that is, the filter bottom surface 26b, the filter holes 26h on the filter bottom surface 26b are blocked and an oil flow f1 on a filter bottom surface 26b side flowing to the filter hole 26h is obstructed. However, in the filter 26, since the filter holes 26h are also provided at the filter side surface 26w, oil flows f2 detouring through the filter side surface 26w side function as main flow paths.

As described above, in the present embodiment, since the filter holes 26h are provided at the filter bottom surface 26b and the filter side surface 26w of the bottomed cylindrical filter 26 in which the filter side surface 26w stands from the filter bottom surface 26b, and the filter bottom surface 26b is held inside the cylindrical portion 23b so as to protrude further upstream side in the oil flow path than the tip end 23bt of the cylindrical portion 23b, even when the foreign matters or foreign particles in the oil are trapped by the filter bottom surface 26b, the oil flow path is ensured by the filter holes 26h in the filter side surface 26w. Therefore, the filter function can be maintained over a long period of time, and the life of the filter 26 can be extended.

Further, in the present embodiment, since the main body 23 has a large-diameter cylindrical portion 23u positioned in contact with the inner wall surface 12iw of the oil passage 12 and the small-diameter cylindrical portion 23i having a smaller diameter than the large-diameter cylindrical portion 23u and holding the filter 26, the space Ts formed between the small-diameter cylindrical portion 23i and the inner wall surface 12iw of the oil passage 12 can function as a trap space for trapping foreign matters in the oil. As a result, it is possible to further extend the life of the filter 26 by keeping the foreign matters in the space Ts.

Further, in the present embodiment, since the filter 26 has a recess portion 26d recessed toward the downstream side of the oil flow path at the approximate center of the filter bottom surface 26b, and the filter holes 26h are also formed in the recess portion 26d, it is possible to increase the filter area of the filter 26 and extend the life of the filter.

Further, in the configuration in which the recess portion 26d is recessed toward the downstream side of the oil passage, the foreign matters can be trapped in the recess portion 26d, the foreign matters can be prevented from turning toward the filter side surface 26w, and the life of the filter can be further extended.

Further, in the present embodiment, the oil passage 12 has an insertion hole 12b into which the main body 23 is inserted and an upstream hole 12a connected to the insertion hole 12b through a step portion 12d and having a smaller diameter than the insertion hole 12b, and the filter bottom surface 26b of the filter 26 is disposed along the step portion 12d. Therefore, the distance d5 between the step portion 12d and the outer peripheral edge of the filter bottom surface 26b can be adjusted to prevent large foreign matters from entering the filter side surface 26w through a gap between the filter bottom surface 26b and the step portion 12d, and the life of the filter 26 can be further extended.

Further, in the present embodiment, since the filter holes 26h provided at the filter side surface 26w of the filter 26 are disposed at further upstream side in the oil flow path than the tip end 23bt of the cylindrical portion 23b, even when the foreign matters or foreign particles in the oil are trapped by the filter bottom surface 26b, the oil flow path is ensured by the filter holes 26h in the filter side surface 26w.

Further, in the present embodiment, since the oil passage 12 to which the main body 23 is inserted is a downward oil supply hole in the use state of the internal combustion engine 1, it is possible to prevent the trapped foreign matters from returning into the oil flow path even in the operation stop state. In addition, foreign matters are easily removed at the time of maintenance.

Although the above-described embodiment has been described as a piston cooling device in an internal combustion engine of a motorcycle, the present invention is not limited thereto and can be applied to various internal combustion engines such as an ATV and a four-wheeled automobile.

Further, in the above-described embodiment, although the filter 26 and the inner peripheral wall 23e of the small-diameter cylindrical portion 23i on which the filter 26 is mounted are formed in circular shapes, they may be, for example, polygonal shapes.

The invention claimed is:

1. A piston cooling device comprising:
   a main body which is attached to an internal combustion engine and includes a communication path communicating with an oil passage provided in the internal combustion engine;
   a nozzle pipe portion which includes an oil injection port for injecting an oil passing through the communication path, toward the piston; and
   a filter which is provided at an upstream side of the nozzle pipe portion in an oil flow path to filter foreign matters in the oil,
   wherein the main body includes a cylindrical portion inserted into the oil passage,
   wherein the cylindrical portion includes:
      a large-diameter cylindrical portion which is fitted to an inner wall surface of the oil passage without gaps; and
      a small-diameter cylindrical portion which is provided further upstream in the oil flow path than the large-diameter cylindrical portion and which has a smaller outer diameter than the large-diameter cylindrical portion,
   wherein the filter has a bottomed cylindrical shape in which a filter side surface stands from a filter bottom surface, and is held inside the cylindrical portion,
   wherein filter holes are formed in the filter bottom surface and the filter side surface,
   wherein the filter is disposed such that the filter bottom surface protrudes further upstream in the oil flow path than a tip end of the cylindrical portion,
   wherein a space is formed between an upstream side of the filter side surface that is located further upstream in the oil flow path than the tip end of the cylindrical portion and the inner wall surface of the oil passage,
   wherein a space is formed between the small-diameter cylindrical portion and the inner wall surface of the oil passage, and
   wherein a distance of the space formed between the upstream side of the filter side surface and the inner wall surface of the oil passage is longer than a distance of the space formed between the small-diameter cylindrical portion and the inner wall surface of the oil passage.

2. The piston cooling device according to claim 1, wherein the filter is held inside an inner diameter of the small-diameter cylindrical portion.

3. The piston cooling device according to claim 1, wherein the filter includes a recess portion recessed toward a downstream side of the oil flow path at an approximate center of the filter bottom surface, and the filter holes are also formed in the recess portion.

4. The piston cooling device according to claim 3, wherein the oil passage includes:
   an insertion hole into which the main body is inserted; and
   an upstream hole which is connected to the insertion hole through a step portion and has a smaller diameter than the insertion hole, and
   wherein the filter bottom surface of the filter is disposed along the step portion.

5. The piston cooling device according to claim 1, wherein the oil passage to which the main body is inserted is a downward oil supply hole in a use state of the internal combustion engine.

6. The piston cooling device according to claim 1, wherein the filter holes formed in the filter side surface of the filter are disposed further upstream in the oil flow path than the tip end of the cylindrical portion.

* * * * *